(12) United States Patent
Suzuki

(10) Patent No.: US 9,695,938 B2
(45) Date of Patent: Jul. 4, 2017

(54) SEALING DEVICE

(71) Applicant: NOK CORPORATION, Tokyo (JP)

(72) Inventor: Atsushi Suzuki, Fukushima (JP)

(73) Assignee: NOK Corporation (JP)

(*) Notice: Subject to any disclaimer, the term of this patent is extended or adjusted under 35 U.S.C. 154(b) by 64 days.

(21) Appl. No.: 14/650,186

(22) PCT Filed: Jun. 21, 2013

(86) PCT No.: PCT/JP2013/067039
§ 371 (c)(1),
(2) Date: Jun. 5, 2015

(87) PCT Pub. No.: WO2014/091781
PCT Pub. Date: Jun. 19, 2014

(65) Prior Publication Data
US 2015/0316151 A1 Nov. 5, 2015

(30) Foreign Application Priority Data
Dec. 14, 2012 (JP) .................... 2012-273225

(51) Int. Cl.
*F16J 15/32* (2016.01)
*F16C 33/78* (2006.01)
(Continued)

(52) U.S. Cl.
CPC ........... *F16J 15/3232* (2013.01); *F16C 33/72* (2013.01); *F16C 33/7876* (2013.01);
(Continued)

(58) Field of Classification Search
CPC .. F16J 15/3232; F16J 15/3252; F16J 15/3264; F16J 15/3284; F16C 33/7816;
(Continued)

(56) References Cited

U.S. PATENT DOCUMENTS 4,195,854 A * 4/1980 Bertin .................. F16J 15/3224
277/549
5,139,425 A * 8/1992 Daviet .................. F16C 19/184
277/402
(Continued)

FOREIGN PATENT DOCUMENTS

EP    1375982 A1    1/2004
EP    2175136 A1    4/2010
(Continued)

OTHER PUBLICATIONS

Extended European Search Report for Application No. EP 13 86 2367 dated Nov. 26, 2015 (7 pages).

*Primary Examiner* — Nicholas L Foster
(74) *Attorney, Agent, or Firm* — Harness, Dickey & Pierce, P.L.C.

(57) ABSTRACT

To provide a scheme that, when making a prediction in multilayer coding, takes into account the quality of the image in each layer and can adaptively determine in want manner to refer to the image of which layer. Provided is an image processing device provided with a prediction control unit that, on the basis of an indicator dependent on the image quality of a first layer image and a second layer image, sets the weighting when including a first layer pixel and a second layer pixel for predicting a pixel in the second layer that is encoded or decoded referring to the first layer.

3 Claims, 4 Drawing Sheets

(51) Int. Cl.
  *F16C 33/72* (2006.01)
  *F16C 33/80* (2006.01)
  *F16J 15/3232* (2016.01)
  *F16J 15/3284* (2016.01)
  *F16J 15/3256* (2016.01)
  *F16J 15/34* (2006.01)
  *F16C 19/18* (2006.01)

(52) U.S. Cl.
  CPC ........ *F16C 33/7879* (2013.01); *F16C 33/805* (2013.01); *F16J 15/3256* (2013.01); *F16J 15/3284* (2013.01); *F16C 19/184* (2013.01); *F16C 2202/32* (2013.01); *F16C 2326/02* (2013.01); *F16J 15/3456* (2013.01)

(58) Field of Classification Search
  CPC .............. F16C 33/7853; F16C 33/7869; F16C 33/7876; F16C 33/7879; F16C 2202/32
  See application file for complete search history.

(56) References Cited

U.S. PATENT DOCUMENTS

| | | | | |
|---|---|---|---|---|
| 6,004,039 A | * | 12/1999 | Yabe | F16C 19/52 277/394 |
| 6,109,794 A | * | 8/2000 | Bertetti | F16C 33/7879 277/565 |
| 2002/0001422 A1 | * | 1/2002 | Maldera | B60B 27/00 384/486 |
| 2003/0002759 A1 | * | 1/2003 | Yabe | B60B 27/00 384/484 |
| 2003/0127803 A1 | * | 7/2003 | Yokoyama | F16C 33/7853 277/549 |
| 2004/0266938 A1 | * | 12/2004 | Tokumitsu | C08K 3/04 524/495 |
| 2011/0129176 A1 | * | 6/2011 | Koma | B60B 27/001 384/484 |
| 2014/0203514 A1 | * | 7/2014 | Colineau | F16J 15/002 277/353 |
| 2016/0010750 A1 | * | 1/2016 | Colineau | F16J 15/3236 277/565 |

FOREIGN PATENT DOCUMENTS

| | | |
|---|---|---|
| EP | 2301766 A1 | 3/2011 |
| JP | S60-245874 A | 12/1985 |
| JP | 2007-146879 A | 6/2007 |
| JP | 2010-071323 A | 4/2010 |
| JP | 2012-097213 A | 5/2012 |

* cited by examiner

SEALING DEVICE

CROSS-REFERENCE TO RELATED APPLICATIONS

This application is a 371 U.S. National Stage Application of International Application No. PCT/JP2013/067039, filed on Jun. 21, 2013, and published in Japanese as WO 2014/091781 A1 on Jun. 19, 2014. This application claims priority to Japanese Application No. 2012-273225, filed on Dec. 14, 2012. The entire disclosures of the above applications are incorporated herein by reference.

BACKGROUND OF THE INVENTION

Field of the Invention

The present invention relates to a sealing device, and more particularly to a sealing which is provided with a seal lip and a dust lip. The sealing device according to the present invention is used, for example, as a hub bearing seal for a vehicle such as a motor vehicle, or a bearing seal for a construction equipment.

Description of the Conventional Art

As the sealing device used as the hub bearing seal for the vehicle such as to the motor vehicle, there has been conventionally known a sealing device provided with a seal lip 71 which prevents a foreign material in a machine external side A from entering into a machine internal side B, and a dust lip 72 which makes the foreign material hard to reach the seal lip 71, as shown in FIG. 4 (refer to Japanese Unexamined Patent Publication No. 2010-71323 [FIG. 5]).

Further, in the hub bearing seal, a rubber material (a conductive rubber material) blended with a conductive carbon at a predetermined amount has been preferably used in recent years as a static electricity removal countermeasure (a radio noise countermeasure) (refer to Japanese Unexamined Patent Publication No. 2012-97213).

However, it has been known that the rubber material blended with the conductive carbon tends to swell and deform due to immersion of muddy water or salt water, in comparison with the rubber material which is not blended with the conductive carbon.

Accordingly, in the case that all the seal lip 71 and the dust lip 72 are integrally formed by the rubber material blended with the conductive carbon in the sealing device in FIG. 4, the dust lip 72 which is always exposed to an external environment is particularly affected greatly. As a result, there is a problem that a sealing property is deteriorated (there is a risk that the dust lip 72 is swollen and deformed, and the sealing property is deteriorated).

SUMMARY OF THE INVENTION

Problem to be Solved by the Invention

The present invention is made by taking the above point into consideration, and an object of the present invention is to provide a sealing device having a seal lip and a dust lip, in which the sealing device is structured such that the dust lip is hard to be swollen and deformed even by applying a static electricity removal countermeasure (a radio noise countermeasure) and a sealing property is hard to be deteriorated.

Means for Solving the Problem

In order to achieve the object mentioned above, a sealing device according to a first aspect of the present invention is a sealing device having a seal lip which seals so as to prevent a foreign material in a machine external side from entering into a machine internal side, and a dust lip which makes the foreign material hard to reach the seal lip, wherein the seal lip is formed by a conductive rubber material, and the dust lip is formed by a material which is lower in a conductivity than the seal lip.

Further, a sealing device according to a second aspect of the present invention is the sealing device described in the first aspect mentioned above, wherein the seal lip is made of a material which is obtained by blending a conductive carbon at 3 to 50 weight part in a rubber at 100 weight part, and the dust lip is made of a material which is obtained by blending the conductive carbon at 1 weight part or less in the rubber at 100 weight part.

Further, a sealing device according to a third aspect of the present invention is the sealing device described in the second aspect mentioned above, wherein the conductive carbon is constructed by Ketjen black or acetylene black.

Further, a sealing device according to a fourth aspect of the present invention is the sealing device described in the first, second or third aspect, wherein the sealing device is used as a hub bearing seal for a vehicle such as a motor vehicle, or a bearing seal for a construction equipment.

The sealing device according to the present invention having the structure mentioned above is provided with the seal lip which seals so as to prevent the foreign material in the machine external side from entering into the machine internal side, and the dust lip which makes the foreign material hard to reach the seal lip, and the seal lip among them is formed by the conductive rubber material. As a result, it is possible to apply a static electricity removal countermeasure (a radio noise countermeasure). On the other hand, the dust lip is formed by the material which is lower in the conductivity than the seal lip. As a result, it is possible to inhibit the dust lip from being swollen and deformed in correspondence to the rate at which the conductivity is low.

It is preferable to particularly employ the material which is obtained by blending the conductive carbon at 3 to 50 weight part, more preferably at 5 to 40 weight part in the rubber at 100 weight part, as the conductive rubber material forming the seal lip. As a result, it is possible to sufficiently apply the static electricity removal countermeasure (the radio noise countermeasure). On the other hand, it is preferable to employ the material which is obtained by blending the conductive carbon at 1 weight part or less, more preferably at 0.5 weight part or less in the rubber at 100 weight part as the material forming the dust lip. As a result, it is possible to sufficiently inhibit the dust lip from being swollen and deformed even if the dust lip is exposed to the muddy water or the salt water. Since the latter material obtained by blending the conductive carbon at 1 weight part or less in the rubber at 100 weight part is extremely low in a blending rate of the conductive carbon, the material can be the to substantially belong to a category of the non-conductive rubber material.

The kind of the conductive carbon blended in the rubber material is not particularly limited, however, the Ketjen black or the acetylene black is, for example, used.

The kind of the rubber material (the base rubber) blended with the conductive carbon is not particularly limited, however, a nitrile rubber, a hydrogenated nitrile rubber or a fluorine-contained rubber is employed, for example.

For example, the following aspects can be considered as aspects of the sealing device.

(a) An integrated outer type in which the seal lip and the dust lip are retained by one metal ring (attaching ring).

(b) A separated outer type in which the seal lip and the dust lip are respectively retained by different metal rings (attaching rings).

(c) A pack type in which the seal lip and the dust lip are both combined with a slinger.

The dust lip may be constructed by a contact type lip which slidably comes into close contact with an opponent member, or may be constructed by a non-contact type lip which is not in contact with the opponent member and forms a labyrinth seal by setting a micro gap.

Further, the dust lip may be constructed by a single stage type lip in which only one lip is provided, or may be constructed by a plural stage type lip in which a plurality of lips are provided in line.

Effect of the Invention

The present invention achieves the following effects.

In other words, in the present invention, the sealing device is provided with the seal lip which seals so as to prevent the foreign material in the machine external side from entering into the machine internal side, and the dust lip which makes the foreign material hard to reach the seal lip, and the seal lip among them is formed by the conductive rubber material, as described above. As a result, it is possible to apply a static electricity removal countermeasure (a radio noise countermeasure). On the other hand, the dust lip is formed by the material which is lower in the conductivity than the seal lip. As a result, it is possible to inhibit the dust lip from being swollen and deformed. It is preferable to employ the material which is obtained by blending the conductive carbon at 3 to 50 weight part in the rubber at 100 weight part, as the conductive rubber material forming the seal lip, and it is preferable to employ the material which is obtained by blending the conductive carbon at 1 weight part or less in the rubber at 100 weight part as the material forming the dust lip. As a result, on the basis of the structure mentioned above, it is possible to provide the sealing device having the structure in which the dust lip is hard to be swollen and deformed and the sealing property is hard to be deteriorated even if the static electricity removal countermeasure (the radio noise countermeasure) is applied in the sealing device having the seal lip and the dust lip according to an initial object of the present invention.

Further, since the sealing device according to the present invention is enhanced in a swelling resistance of the dust lip, the sealing device is suitably used under a condition that the sealing device is exposed to the muddy water or the salt water. As a result, it is possible to provide the sealing device which is preferably used as the hub bearing seal for the vehicle such as the motor vehicle, or the bearing seal for the construction equipment.

DETAILED DESCRIPTION OF PREFERRED EMBODIMENTS

The following embodiments are included in the present invention.

(1) The present invention relates to a method of preventing a lip deformation in a hub bearing seal (a hub seal).

(2) The present invention is characterized by using a non-conductive rubber material in which a blending amount of a conductive carbon of Ketjen black or acetylene black is set to be equal to or less than 1 weight part, preferably equal to or less than 0.5 weight part in relation to a rubber 100 weight part, in a dust seal portion in an outermost periphery and using a conductive rubber material in which a conductive carbon is blended at 3 to 50 weight part, preferably 5 to 40 weight part, in a seal portion which is inside the dust seal portion, in a seal structure which is exposed to the muddy water or the salt water, for example, the hub seal.

(3) According to the present invention, since the dust seal portion in the outermost periphery which is exposed to the muddy water or the salt water is constructed by the rubber material in which the blending amount of the Ketjen black or the acetylene black is small, it is possible to suppress a seal defect caused by the muddy water or the salt water. As a result, it is possible to apply a static electricity unloading which comes to a radio noise countermeasure, by constructing the seal structure inside the dust seal portion by the rubber material obtained by blending the Ketjen black or the acetylene black.

Embodiments

Next, a description will be given of embodiments according to the present invention with reference to the accompanying drawings.

All sealing devices according to respective embodiments mentioned below is used as a hub bearing seal (a hub seal) in a bearing portion in a wheel suspension device for a motor vehicle, and prevents a lubricating grease in a bearing inner portion (a machine internal side) B from leaking to a bearing outer portion (a machine external side) A as well as preventing a foreign material such as a dust or a water content (including a muddy water or a salt water) in the bearing outer portion A from entering into the bearing inner portion B.

First Embodiment

Figure 1:
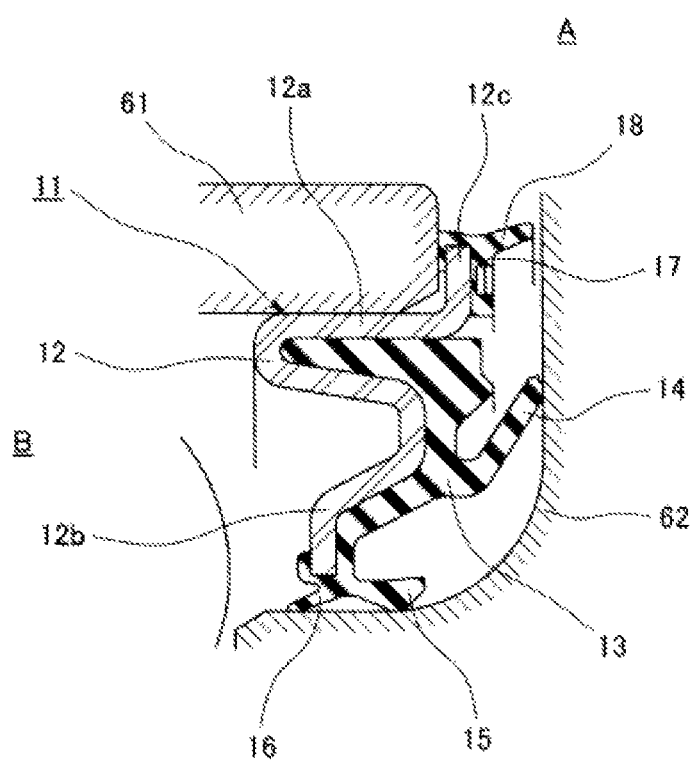
FIG. 1 is a cross sectional view of a substantial part of a sealing device according to a first embodiment of the present invention.

A sealing device 11 shown in FIG. 1 is an integrated outer type sealing device in which a seal lip and a dust lip are retained by one metal ring (attaching ring) described in the above item (a).

A metal ring 12 is provided with a tubular portion 12a which is fitted to an inner peripheral surface of an outer race (a housing) 61 in the bearing portion, a first bent portion 12b is integrally formed in an end portion in a machine internal side of the tubular portion 12a toward an inner side in a diametrical direction, a first rubber-like elastic body 13 is attached to the tubular portion 12a and the first bent portion 12b, and a first seal lip (a side lip) 14, a second seal lip (a radial lip) 15 and a grease lip 16 are integrally formed by the first rubber-like elastic body 13. The first seal lip (the side lip) 14 and the second seal lip (the radial lip) 15 seals so as to prevent the foreign material in the bearing outer portion A from entering into the bearing inner portion B by slidably coming into close contact with a rotary member 62 such as an inner race or a rotation shaft, and the grease lip 16 seals so as to prevent the grease in the bearing inner portion B from leaking out to the bearing outer portion A.

The first rubber-like elastic body 13 is formed by a conductive rubber material, particularly formed by a material which is obtained by blending a conductive carbon at 3 to 50 weight part in a rubber at 100 weight part. As a result, it is possible to sufficiently apply a static electricity removal countermeasure (a radio noise countermeasure).

Further, a second bent portion 12*c* is integrally formed in an end portion in a machine external side of the tubular portion 12*a* in the metal ring 12 toward an outer side in a diametrical direction, a second rubber-like elastic body 17 is attached to the second bent portion 12*c*, and a dust lip 18 is formed by the second rubber-like elastic body 17, the dust lip 18 making the foreign material in the bearing outer portion A hard to reach the seal lips 14 and 15.

The second rubber-like elastic body 17 is formed by a material which is lower in a conductivity than the first rubber-like elastic body 13, particularly formed by a material which is obtained by blending a conductive carbon at 1 weight part or less in the rubber at 100 weight part. As a result, it is possible to inhibit the dust lip 18 from being swollen and deformed even if the dust lip 18 is exposed to the muddy water or the salt water.

The dust lip 18 is formed as a non-contact type lip which forms a labyrinth seal by setting a micro gap while being in non-contact with the rotary member 62, however, may be constructed by a contact type lip which slidably comes into close contact with the rotary member 62. Further, the dust lip 18 is formed as a single stage type lip in which only one lip is provided, however, may be formed as a plural stage type lip in which a plurality of lips are provided in line.

Second Embodiment

Figure 2:
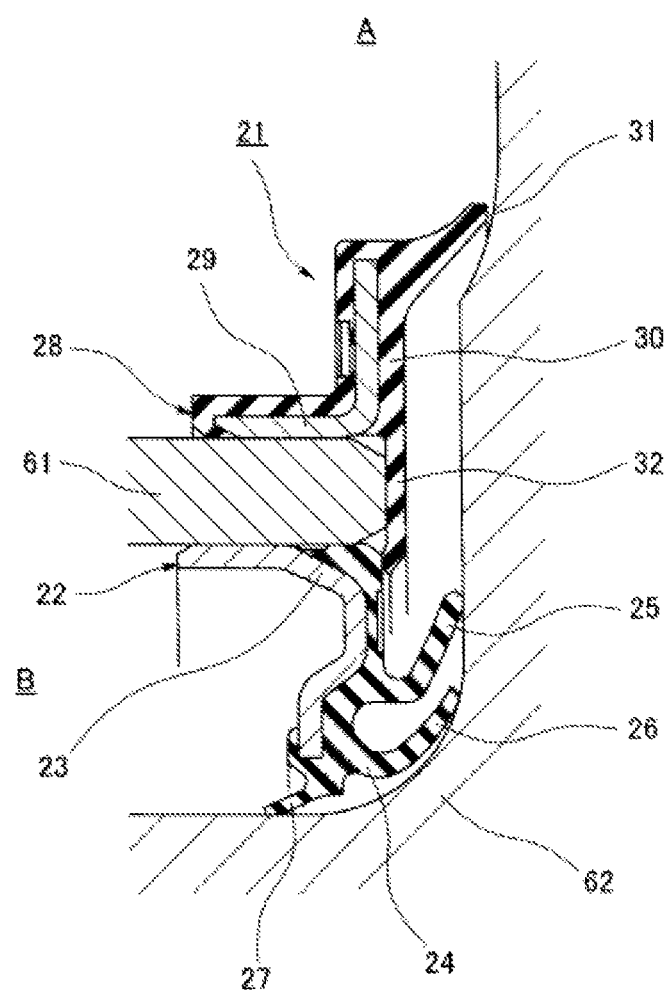
FIG. 2 is a cross sectional view of a substantial part of a sealing device according to a second embodiment of the present invention.

A sealing device 21 shown in FIG. 2 is a separated outer type sealing device in which the seal lip and the dust lip are respectively retained by different metal rings (attaching rings) described in the above item (b), and has a first lip seal member (an inner peripheral side lip seal member) 22 which is installed to an inner peripheral side of the outer race (housing) 61 in the bearing portion, and a second lip seal member (an outer peripheral side lip seal member) 28 which is installed to an outer peripheral side of the outer race 61 in the bearing portion.

The first lip seal member 22 is obtained by attaching a first rubber-like elastic body 24 to a first metal ring 23 which is fitted to an inner peripheral surface of the outer race 61 and is approximately formed into an L-shaped cross section, and a first seal lip (a side lip) 25, a second seal lip (a side lip) 26 and a grease lip 27 are integrally formed by the first rubber-like elastic body 24. The first seal lip 25 and the second seal lip 26 seal so as to prevent the foreign material in the bearing outer portion A from entering into the bearing inner portion B, and the grease lip 27 seals so as to prevent the grease in the bearing inner portion B from leaking to the bearing outer portion A, by slidably coming into close contact with the rotary member 62.

The first rubber-like elastic body 24 is formed by a conductive rubber material, particularly formed by a material which is obtained by blending a conductive carbon at 3 to 50 weight part in a rubber at 100 weight part. As a result, it is possible to sufficiently apply a static electricity removal countermeasure (a radio noise countermeasure).

The second lip seal member 28 is obtained by attaching a second rubber-like elastic body 30 to a second metal ring 29 which is fitted to an outer peripheral surface of the outer race 61 and is approximately formed into an L-shaped cross section, and a dust lip 31 and an end face cover portion 32 are integrally formed by the second rubber-like elastic body 30. The dust lip 31 makes the foreign material in the bearing outer portion A hard to reach the seal lips 25 and 26, and the end face cover portion 32 covers an end face of the outer race 61 so as to make the metal outer race 61 hard to be rusted.

The second rubber-like elastic body 30 is formed by a material which is lower in a conductivity than the first rubber-like elastic body 24, particularly formed by a material which is obtained by blending a conductive carbon at 1 weight part or less in the rubber at 100 weight part. As a result, it is possible to inhibit the dust lip 18 from being swollen and deformed even if the dust lip 31 is exposed to the muddy water or the salt water.

The dust lip 31 is formed as a non-contact type lip which forms a labyrinth seal by setting a micro gap while being in non-contact with the rotary member 62, however, may be constructed by a contact type lip which slidably comes into close contact with the rotary member 62. Further, the dust lip 31 is formed as a single stage type lip in which only one lip is provided, however, may be formed as a plural stage type lip in which a plurality of lips are provided in line.

Third Embodiment

Figure 3:
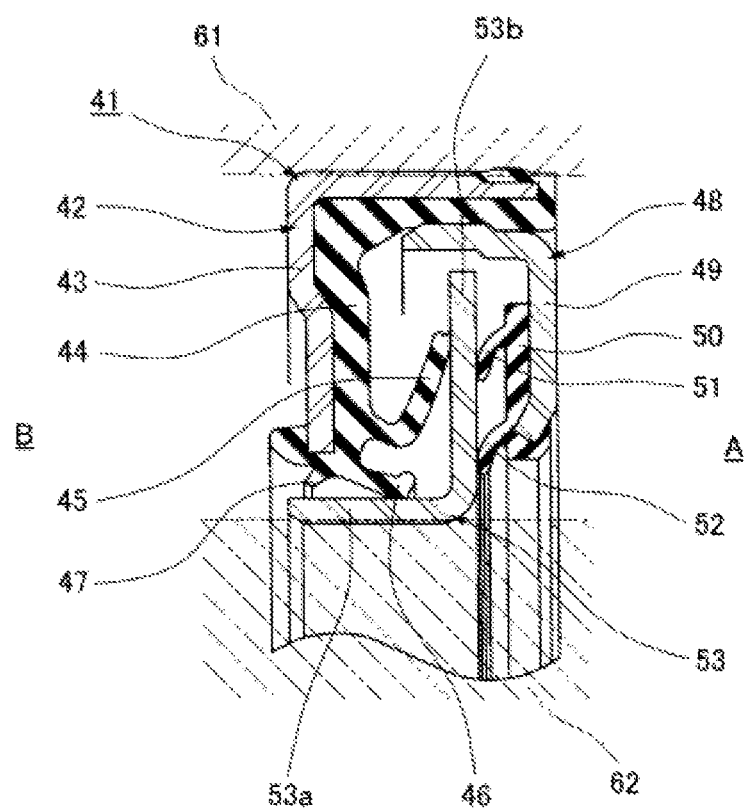
FIG. 3 is a cross sectional view of a substantial part of a sealing device according to a third embodiment of the present invention.
Figure 4:
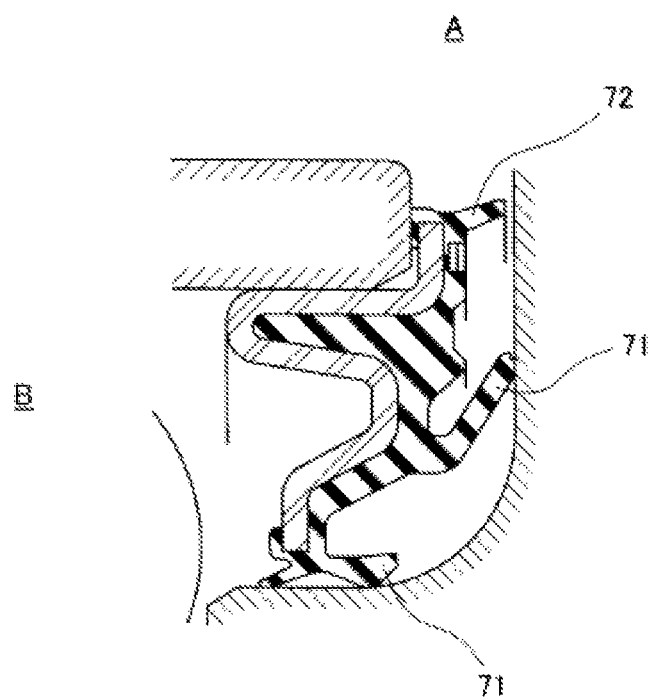
FIG. 4 is a cross sectional view of a substantial part of a sealing device according to a prior art.

A sealing device 41 shown in FIG. 3 is a pack type sealing device in which the seal lip and the dust lip are both combined with a slinger described in the above item (c), and has a first lip seal member 42 which is installed to an inner peripheral side of the outer race (housing) 61 in the bearing portion, a second lip seal member 48 which is installed to an inner peripheral side of a fitting portion of the first lip seal member 42, and a slinger 53 which is installed to an outer peripheral side of the rotary member 62.

The slinger 53 is constructed by a predetermined metal member, and is provided with a tubular portion 53*a* which is fitted to an outer peripheral surface of the rotary member 62, and a flange portion 53*b* is integrally formed in an end portion in a machine external side of the tubular portion 53*a* toward an outer side in a diametrical direction.

The first lip seal member 42 is obtained by attaching a first rubber-like elastic body 44 to a first metal ring 43 which is fitted to an inner peripheral surface of the outer race 61 and is approximately formed into an L-shaped cross section, and a first seal lip (a side lip) 45, a second seal lip (a radial lip) 46 and a grease lip 47 are integrally formed by the first rubber-like elastic body 44. The first seal lip 45 seals so as to prevent the foreign material in the bearing outer portion A from entering into the bearing inner portion B by slidably coming into close contact with an end surface in a machine internal side of the flange portion 53*b* in the slinger 53, the second seal lip 46 seals so as to prevent the foreign material in the bearing outer portion A from entering into the bearing inner portion B by slidably coming into close contact with the outer peripheral surface of the tubular portion 53*a* in the slinger 53, and the grease lip 47 seals so as to prevent the grease in the bearing inner portion B from leaking to the bearing outer portion A.

The first rubber-like elastic body 44 is formed by a conductive rubber material, particularly formed by a material which is obtained by blending a conductive carbon at 3 to 50 weight part in a rubber at 100 weight part. As a result, it is possible to sufficiently apply a static electricity removal countermeasure (a radio noise countermeasure).

The second lip seal member 48 is obtained by attaching a second rubber-like elastic body 50 to a second metal ring 49 which is fitted to an inner peripheral surface of a fitting portion of the first lip seal member 42 and is approximately formed into an L-shaped cross section, and a first dust lip (a side lip) 51 and a second dust lip (a side lip) 52 are integrally formed by slidably coming into close contact with an end surface in a machine external side of the flange portion 53*b* in the slinger 53. The first dust lip 51 and the second dust lip 52 make the foreign material in the bearing outer portion A hard to reach the seal lips 45 and 46.

The second rubber-like elastic body 50 is formed by a material which is lower in a conductivity than the first rubber-like elastic body 44, particularly formed by a material which is obtained by blending a conductive carbon at 1 weight part or less in the rubber at 100 weight part. As a result, it is possible to inhibit the dust lip 51 and 52 from being swollen and deformed even if the dust lips 51 and 52 are exposed to the muddy water or the salt water.

The dust lips 51 and 51 are constructed as a contact type lip which slidably come into close contact with the flange portion 53*b* of the slinger 53, however, may be constructed by a non-contact type lip which forms a labyrinth seal by setting a micro gap while being in non-contact with the flange portion 53*b* of the slinger 53. Further, the dust lips 51 and 52 are constructed as the plural stage type lip in which a plurality of lips are provided in line, however, may be constructed as a single stage type lip in which only one lip is provided.

Since the seal lips 14, 15, 25, 26, 45 and 46 are formed by the conductive rubber material in any of the embodiments mentioned above, it is possible to apply the static electricity removal countermeasure (the radio noise countermeasure). Further, since the dust lips 18, 31, 51 and 52 are formed by the material which is lower in the conductivity than the seal lips 14, 15, 25, 26, 45 and 46, it is possible to inhibit the dust lips 18, 31, 51 and 52 from being swollen and deformed. As a result, in the sealing device 11, 21 and 41 provided with the seal lips 14, 15, 25, 26, 45 and 46, and the dust lips 18, 31, 51 and 52, it is possible to provide the sealing device which is structured such that the dust lips 18, 31, 51 and 52 are hard to be swollen and deformed and the sealing property is hard to be deteriorated even if the static electricity removal countermeasure (the radio noise countermeasure) is applied.

What is claimed is:

1. A hub bearing sealing assembly for a motor vehicle, the hub bearing sealing assembly comprising:
    a bearing with a relatively rotatable inner race and outer race; and
    a sealing device positioned between the inner race and outer race of the bearing and fixed to the outer race of the bearing, the sealing device separating and sealing a machine external side from a machine internal side;
    wherein the sealing device comprises:
        a seal lip which contacts the inner race so as to prevent a foreign material in the machine external side from entering into the machine internal side; and
        a dust lip positioned closer to the machine external side than the seal lip and which makes said foreign material hard to reach said seal,
    wherein said seal lip is formed by an electrically conductive rubber material, and said dust lip is formed by a rubber material which is lower in electrical conductivity than the electrically conductive rubber material of said seal lip,
    wherein the electrically conductive rubber material of the seal lip is formed from rubber blended with conductive carbon,
    wherein the seal lip provides static electricity removal between the inner race and the outer race, and
    wherein the dust lip resist swelling when exposed to muddy water or salt water due to the material of the dust lip having substantially less conductive carbon blended therein than the electrically conductive rubber material of the seal lip or having no conductive carbon blended therein.

2. The hub bearing sealing assembly according to claim 1, wherein the electrically conductive rubber material of said seal lip includes the conductive carbon in an amount of 3 to 50 parts by weight and the rubber in an amount of 100 parts by weight, and the rubber material of said dust lip which is lower in electrical conductivity than the electrically conductive rubber material of the seal lip includes rubber in an amount of 100 parts by weight and may include from zero to 1 part by weight of the conductive carbon.

3. The hub bearing sealing assembly according to claim 2, wherein said conductive carbon is KETJENBLACK® or acetylene black.

* * * * *